United States Patent [19]

Joo et al.

[11] Patent Number: 5,299,004
[45] Date of Patent: Mar. 29, 1994

[54] GHOST SIGNAL REMOVAL APPARATUS FOR BROADCASTING RECEPTION SYSTEM

[75] Inventors: Kwang C. Joo; Woo J. Song, both of Kyungsangbuk-do, Rep. of Korea

[73] Assignee: Goldstar Co., Ltd., Seoul, Rep. of Korea

[21] Appl. No.: 996,439

[22] Filed: Dec. 24, 1992

[30] Foreign Application Priority Data

Dec. 24, 1991 [KR] Rep. of Korea .............. 24179/1991

[51] Int. Cl.$^5$ .................... H04N 5/213; H04N 5/210
[52] U.S. Cl. ............................................. 348/614
[58] Field of Search ............... 358/167, 905, 166, 36, 358/37; H04N 5/210, 5/213, 5/208, 9/64, 5/14

[56] References Cited

U.S. PATENT DOCUMENTS

| | | | |
|---|---|---|---|
| 4,947,252 | 8/1990 | Kobayashi et al. | 358/167 |
| 5,138,453 | 8/1992 | Kobayashi et al. | 358/905 |
| 5,184,221 | 2/1993 | Nishi et al. | 358/905 |

FOREIGN PATENT DOCUMENTS

| | | | |
|---|---|---|---|
| 0209882 | 8/1989 | Japan | H04N 5/210 |
| 0073677 | 3/1991 | Japan | H04N 5/210 |
| 0117979 | 5/1991 | Japan | H04N 5/210 |
| 0253177 | 11/1991 | Japan | H04N 5/210 |
| 4-079678 | 3/1992 | Japan | H04N 5/210 |

*Primary Examiner*—James J. Groody
*Assistant Examiner*—Michael H. Lee
*Attorney, Agent, or Firm*—Finnegan, Henderson, Farabow, Garrett & Dunner

[57] ABSTRACT

A ghost signal removal apparatus for a broadcasting reception system, includes an analog/digital converter for converting a video signal of a received broadcasting signal into a digital signal. A first filtering circuit is adaptive to a reference signal contained in the digital signal from the analog/digital converter, to remove from the digital signal a ghost signal component appearing at the front of a main video signal. A second filtering circuit is adaptive to a reference signal contained in an output signal from the first filtering circuit, to remove from a fed-back final video signal a ghost signal component appearing at the rear of the main video signal. A subtractor subtracts an output signal from the second filtering circuit from the output signal from the first filtering circuit to obtain the final video signal in which the ghost signal has been removed. A digital/analog converter converts an output signal from the subtractor into an analog signal.

9 Claims, 5 Drawing Sheets

GHOST SIGNAL REMOVAL APPARATUS FOR BROADCASTING RECEPTION SYSTEM

BACKGROUND OF THE INVENTION

1. Field of the Invention

The present invention relates in general to a system for receiving a broadcast signal such as a television signal, and more particularly to a broadcasting reception system which is capable of removing a ghost signal from a broadcast video signal.

2. Description of the Prior Art

Generally, a ghost signal is contained in a broadcast signal received by a television receiver. For this reason, a broadcast signal is normally transmitted from a broadcasting station, with a reference signal being contained in a main video signal of the broadcast signal for the purpose of removal of the ghost signal. The reference signal is, typically, contained in the video signal at the rate of one line per field. Alternatively, the reference signal may be contained in the video signal at the rate of one line every eight lines or at the rate of one line per frame. In an NTSC television broadcasting system, each screen is referred to as a frame, which consists of two fields and has 525 scanning lines.

Figure 1:
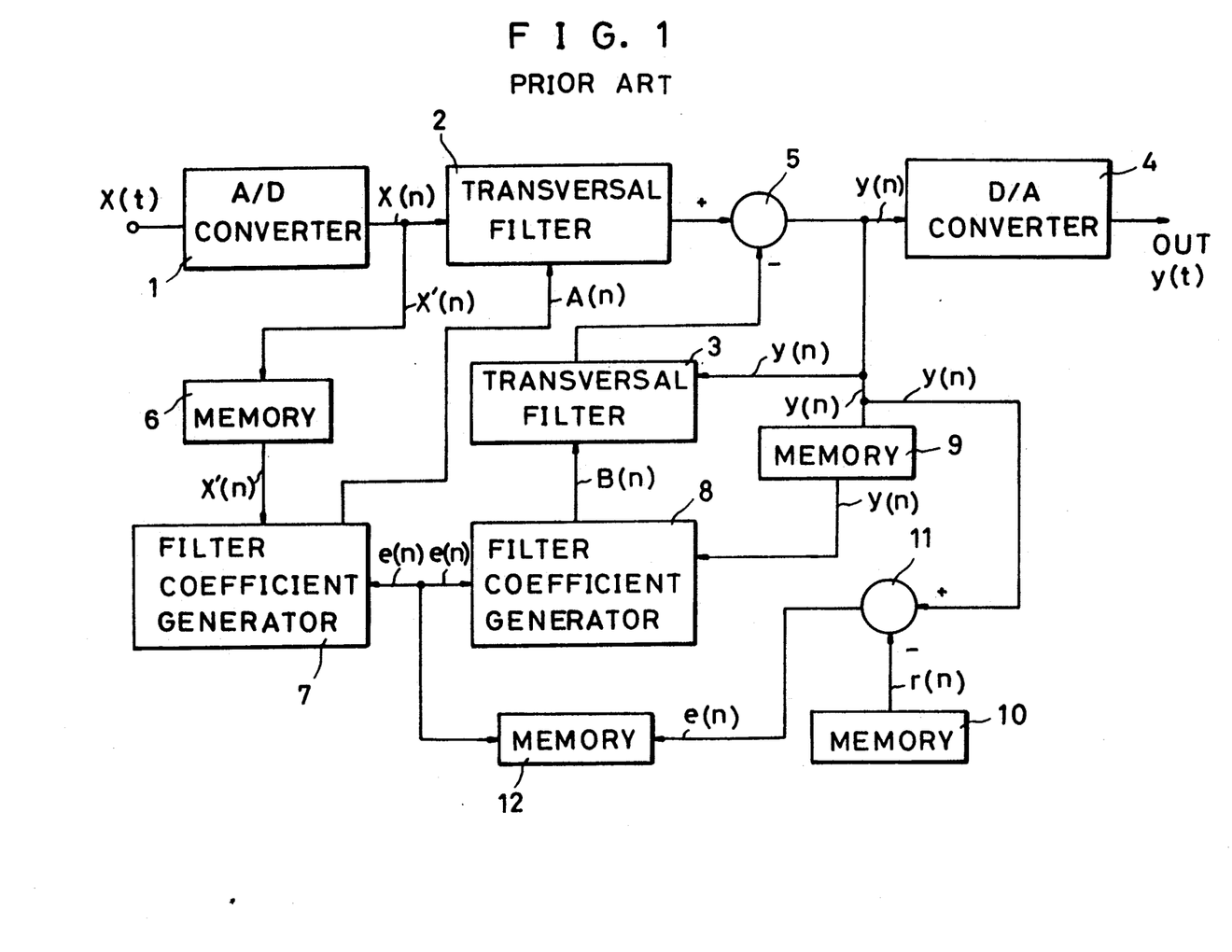
FIG. 1 is a prior art block diagram of a conventional ghost signal removal apparatus for a broadcast reception system.

Referring to FIG. 1, there is shown a block diagram of a conventional ghost signal removal apparatus for a broadcast reception system such as a television receiver. As shown in FIG. 1, the conventional ghost signal removal apparatus includes an analog/digital (A/D) converter 1 for converting a main video signal x(t) of a received television signal into a corresponding digital signal x(n).

A transversal filter 2 is provided for removing from the digital signal x(n) a ghost signal component appearing at the front of a main video signal, and a transversal filter 3 is provided for removing a ghost signal component appearing at the rear of the main video signal. A digital/analog (D/A) converter 4 converts a final video signal y(n), already processed for ghost signal removal into an analog signal. A subtracter 5 subtracts an output signal from the transversal filter 3 from an output signal from the transversal filter 2, and outputs the resulting signal as the final video signal y(n), processed for ghost signals removal, to the D/A converter 4.

A memory 6 stores a reference signal x'(n) which is contained in the digital video signal x(n) from the A/D converter 1. A memory 9 stores the final video signal y(n) from the subtracter 5. Additionally, a memory 12 stores an error signal e(n).

A filter coefficient generator 7 executes a least mean square (LMS) algorithm using the reference signal x'(n) stored in the memory 6 and the error signal e(n) stored in the memory 12 to obtain a filter coefficient A(n) for the transversal filter 2. A filter coefficient generator 8 executes a least mean square (LMS) algorithm using the final video signal y(n) stored in the memory 9 and the error signal e(n) stored in the memory 12 to obtain a filter coefficient B(n) for the transversal filter 3.

A memory 10 stores a predetermined ghost removal reference signal r(n) which is the same as a ghost removal reference signal transmitted from a broadcasting station. A subtracter 11 subtracts the predetermined reference signal r(n) from the final video signal y(n) and outputs the resulting signal as the error signal e(n).

The operation of the conventional ghost signal removal apparatus with the above-mentioned construction will hereinafter be described.

The broadcast signal transmitted from the broadcasting station through an antenna is reflected by objects such as buildings, mountains, etc., and the original and reflected signals are received by television receivers with time differences among them. The video signal x(t) component of the received broadcast signal can be defined by the following equation (1) with respect to time t:

$$x(t) = \ldots a_{-2}u(t-2) + a_{-1}u(t-1) + u(t) + a_1 u(t+1) + a_2 u(t+2) + \ldots \quad \text{(EQUATION 1)}$$

where, $a < 1$.

Figure 2:
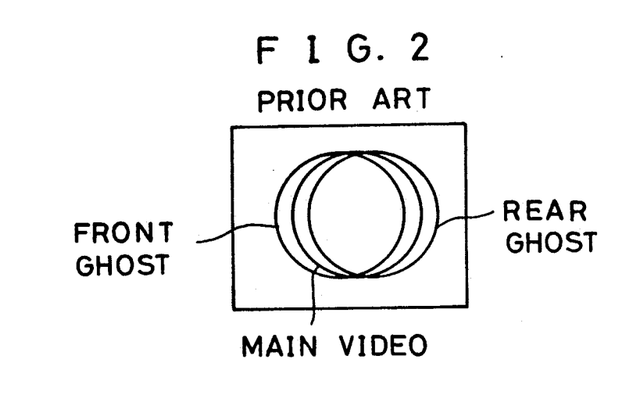
FIG. 2 is a prior art diagram illustrating a conventional screen which contains ghost signals.

Herein, the u(t) term represents the main video signal component as shown in a diagram in FIG. 2. The diagram illustrates a screen which contains the main video signal component and ghost signal components of a received broadcast signal. The terms positioned in the equation to the left of the u(t) term represent the ghost signal components appearing at the front of the main video signal, and the equation terms positioned to the right of the u(t) term represent the ghost signal components appearing at the rear of the main video signal.

The video signal x(t) of the received television signal is converted into the digital signal x(n) (where, n is the sample number) by the A/D converter 1, which then applies the digital signal x(n) to the transversal filter 2.

At this time, only the reference signal x'(n) component of in the digital signal x(n) from the A/D converter 1 is stored in the memory 6. The filter coefficient generator 7 generates the filter coefficient A(n) for the transversal filter 2 by performing the LMS algorithm using the reference signal x'(n) stored in the memory 6 and the error signal e(n) stored in the memory 12. The transversal filter 2 adjusts its filter coefficient in accordance with the filter coefficient A(n) from the filter coefficient generator 7 and filters the digital signal x(n) from the A/D converter 1 on the basis of the adjusted filter coefficient. The transversal filter 2 outputs a video signal with the ghost signal component at the front of the main video signal removed. The video signal from the transversal filter 2 is fed to the subtracter 5.

The transversal filter 3 receives the final video signal y(n) as an input and adjusts its filter coefficient in accordance with the filter coefficient B(n) from the filter coefficient generator 8. The transversal filter 3 then filters the final video signal y(n) on the basis of the adjusted filter coefficient, thereby to output the video signal in which has been removed the ghost signal component at the rear of the main video signal. The video signal from the transversal filter 3 is also fed to the subtracter 5.

The filter coefficient generator 8 obtains the filter coefficient B(n) for the transversal filter 3 by executing the LMS algorithm using the final video signal y(n) stored in the memory 9 and the error signal e(n) stored in the memory 12.

The subtracter 5 subtracts the output signal from the transversal filter 3 from the output signal from the transversal filter 2 and outputs the subtracted signal as the final video signal y(n), processed for ghost signal removal, to the D/A converter 4, which then converts the final video signal y(n) into the analog signal y(t).

The memory 6 stores the reference signal x'(n) for removal of the ghost signal, which is contained in the video signal transmitted from the broadcasting station, and then feeds the stored reference signal x'(n) to the filter coefficient generator 7 as a signal for use in execution of the LMS algorithm. The memory 9 stores the final video signal y(n) from the subtracter 5 and then feeds the stored final video signal y(n) to the filter coefficient generator 8 as a signal for use in execution of the LMS algorithm.

The subtracter 11 receives the final video signal y(n) from the subtracter 5 and the ghost signal removal reference signal r(n) from the memory 10 and generates the error signal e(n) for storage in the memory 12.

The memory 12 feeds the stored error signal e(n) to the filter coefficient generators 7 and 8 as a signal for use in execution of the LMS algorithm. The transversal filters 2 and 3 are a kind of adaptive digital filter.

Figure 3:
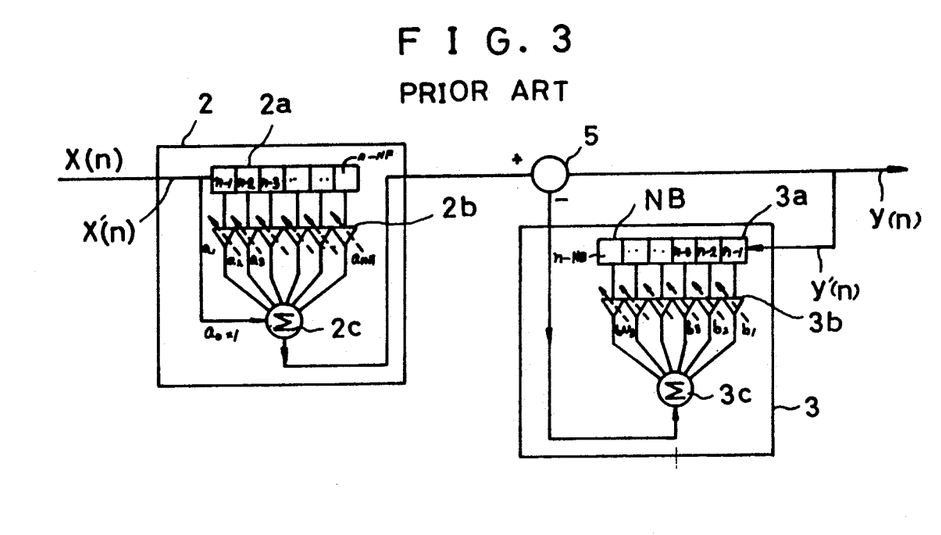
FIG. 3 is a prior art block diagram of transversal filters in the apparatus in FIG. 1.

Referring to FIG. 3, there is shown a block diagram of the transversal filters 2 and 3. As shown in this drawing, the transversal filter 2 includes a delay element 2a for delaying and storing the digital signal x'(n) inputted therein by a plurality of steps. Each of a plurality of gain adjustment taps 2b, adjusts a gain of a corresponding one of the signals stored by the plurality of steps in accordance with a corresponding one of elements of the filter coefficient A(n) from the filter coefficient generator 7. An adder 2c adds output signals from the plurality of gain adjustment taps 2b.

Similarly, the transversal filter 3 includes a delay element 3a for delaying and storing the digital signal inputted therein by a plurality of steps. Each of a plurality of gain adjustment taps 3b adjusts a gain of a corresponding one of the signals stored by the plurality of steps in accordance with a corresponding one of elements of the filter coefficient B(n) from the filter coefficient generator 8. An adder 3c adds the output signals from the plurality of gain adjustment taps 3b.

In the transversal filter 2, the delay element 2a delays the inputted digital signal or the video signal x(n) by n−1 to n−NF steps and sequentially stores the delayed NF samples. Each of the NF gain adjustment taps 2b reads a corresponding one of the stored NF samples and adjusts the gain of the read sample in accordance with a corresponding one of the elements $a_1$ to $a_{NF}$ of the filter coefficient A(n) which are generated by the filter coefficient generator 7 as a result of the execution of the LMS algorithm. The adder 2c adds the output signals from the gain adjustment taps 2b and outputs the added signal as the video signal from which the ghost signal component at the front of the main video signal has been processed for removal.

In the transversal filter 2, the delay element 3a delays the inputted digital signal or the fed-back final video signal y(n) by n−1 to n−NB steps and sequentially stores the delayed NB samples. Each of the NB gain adjustment taps 3b reads a corresponding one of the stored NB samples and adjusts the gain of the read sample in accordance with a corresponding one of the elements $b_1$ to $b_{NB}$ of the filter coefficient B(n) which are generated by the filter coefficient generator 8 as a result of the execution of the LMS algorithm. The adder 3c adds the output signals from the gain adjustment taps 3b and outputs the added signal as the video signal from which the ghost signal component at the rear of the main video signal has been processed for removal.

The subtracter 5 subtracts the output signal from the transversal filter 3 from the output signal from the transversal filter 2 and outputs the resulting signal as the ghost signal-removed final video signal y(n), which can be defined by the following equation:

$$y(n) = \sum_{i=0}^{N} a_i(n)x(n-i) - \sum_{j=0}^{N} b_j(n)y(n-j) \quad \text{(EQUATION 2)}$$

where, the ai and bj terms are the filter coefficients or gain adjustment coefficients which are adjusted as a result of the execution of the LMS algorithm, i and j are progression variables, and N is a positive integer.

The video signal in FIG. 1 can be expressed as the sample values as follows:

Namely, the reference signal x'(n) which is fed from the memory 6 to the filter coefficient generator 7 can be expressed by the following equation:

$$x'(n)=[x'(n)x'(n-1)\ldots x'(n-NF)] \quad \text{(EQUATION 3)}$$

The final video signal y(n) which is fed from the memory 9 to the filter coefficient generator 8 can be expressed by the following equation:

$$y(n)=[y(n-1)\ldots y(n-NB)] \quad \text{(EQUATION 4)}$$

The ghost signal removal reference signal r(n) which is stored in the memory 10 can be expressed by the following equation:

$$r(n)=[r(n)r(n-1)r(n-2)\ldots r(n-NB)] \quad \text{(EQUATION 5)}$$

The error signal e(n) which is outputted from the subtracter can be expressed by the following equation:

$$e(n)=r(n)-y(n) \quad \text{(EQUATION 6)}$$

The filter coefficient generator 7 executes the LMS algorithm with respect to the inputted signals x'(n) and e(n) as follows:

$$A(n)=A(n-1)+2K_1e(n-1)x'(n-1) \quad \text{(EQUATION 7)}$$

The filter coefficient generator 7 obtains the filter coefficient A(n) of the transversal filter 2 by executing the LMS algorithm defined by EQUATION 7. The elements $a_1-a_{NF}$ of the filter coefficient A(n) from the filter coefficient generator 7 are applied to the gain adjustment taps 2b in the transversal filter 2, respectively, and can be expressed by the following equation:

$$A(n)=[a_0(n)a_1(n)a_2(n)\ldots a_{NF}(n)]^T \quad \text{(EQUATION 8)}$$

The filter coefficient A(n) is repeatedly obtained such that it is adaptive to the reference signals which are contained in the successively inputted video signals, for removal of the ghost signal components at the front of the main video signals in the transversal filter 2.

The filter coefficient generator 8 executes the LMS algorithm with respect to the inputted signals y(n) and e(n) as follows:

$$B(n) = B(n-1) + 2K_2 e(n-1) y(n-1) \quad \text{(EQUATION 9)}$$

The filter coefficient generator 8 obtains the filter coefficient $B(n)$ of the transversal filter 3 by executing the LMS algorithm defined by EQUATION 9. The elements $b_1 - b_{NF}$ of the filter coefficient $B(n)$ from the filter coefficient generator 8 are applied to the gain adjustment taps $3b$ in the transversal filter 3, respectively, and can be defined by the following equation:

$$B(n) = [b_0(n) b_1(n) b_2(n) \ldots b_{NB}(n)]^T \quad \text{(EQUATION 10)}$$

The filter coefficient $B(n)$ is repeatedly obtained such that it is adaptive to the reference signals which are contained in the successively inputted video signals, for removal of the ghost signal components at the rear of the main video signals in the transversal filter 3. In the LMS algorithms for the filter coefficients $A(n)$ and $B(n)$, $K_1$ and $K_2$ are inherent constants of the transversal filters 2 and 3 which are determined suitably to convergence speeds and stabilities of the transversal filters 2 and 3, respectively.

As indicated above, the conventional ghost signal removal apparatus comprises the transversal filters 2 and 3, which are adaptive digital filters, and the filter coefficient generators 7 and 8 which execute the LMS algorithm to obtain the filter coefficients $A(n)$ and $B(n)$ for the transversal filters 2 and 3, respectively, thereby providing for removal of the ghost signal components at the front and rear of the main video signal.

However, the conventional ghost signal removal apparatus has the following disadvantages:

First, since the LMS algorithms for removal of the ghost signal components at the front and rear of the main video signal are not performed, the ghost signal removal process is reduced in speed due to the resulting sequential executions.

Second, as connected for feedback operation, the transversal filter has an effect on the generation of the filter coefficient $B(n)$, and the stability of the ghost signal removal operation accordingly cannot be assured.

SUMMARY OF THE INVENTION

The present invention has been made in view of the above problems. It is an object of the present invention to provide a ghost signal removal apparatus for a broadcast reception system which is capable of shortening a period of time required to remove a ghost signal.

It is another object of the present invention to provide a ghost signal removal apparatus for a broadcast reception system which is capable of removing a ghost signal stably.

To obtain the above and other objects, the invention provides two operation means which are capable of independently performing operations for generation of filter coefficients for removal of the ghost signal components at the front and rear of the main video signal. Therefore, with the two operation means, the LMS algorithms can be performed independently and a parallel algorithm execution process is enabled, resulting in prevention of the delay in the ghost signal removal process due to the serial process. Furthermore, with the two operation means, the transversal filter has no effect on the generation of the filter coefficient $B(n)$, thereby assuring stability of the ghost signal removal operation.

In accordance with the present invention, a ghost signal removal apparatus for a broadcast reception system comprises analog/digital converting means for converting a video signal of a received broadcasting signal into a digital signal and first filtering means, being adaptive to a reference signal contained in the digital signal from the analog/digital converting means, removes from the digital signal from the analog/digital converting means a ghost signal component appearing at the front of a main video signal. Additionally, second filtering means, being adaptive to a reference signal contained in an output signal from the first filtering means, removes from a fed-back final video signal a ghost signal component appearing at the rear of the main video signal. Subtracting means subtract an output signal from the second filtering means from the output signal from the first filtering means to obtain the final video signal in which the ghost signal has been removed. Digital/analog converting means convert an output signal from said subtracting means into an analog signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 4:
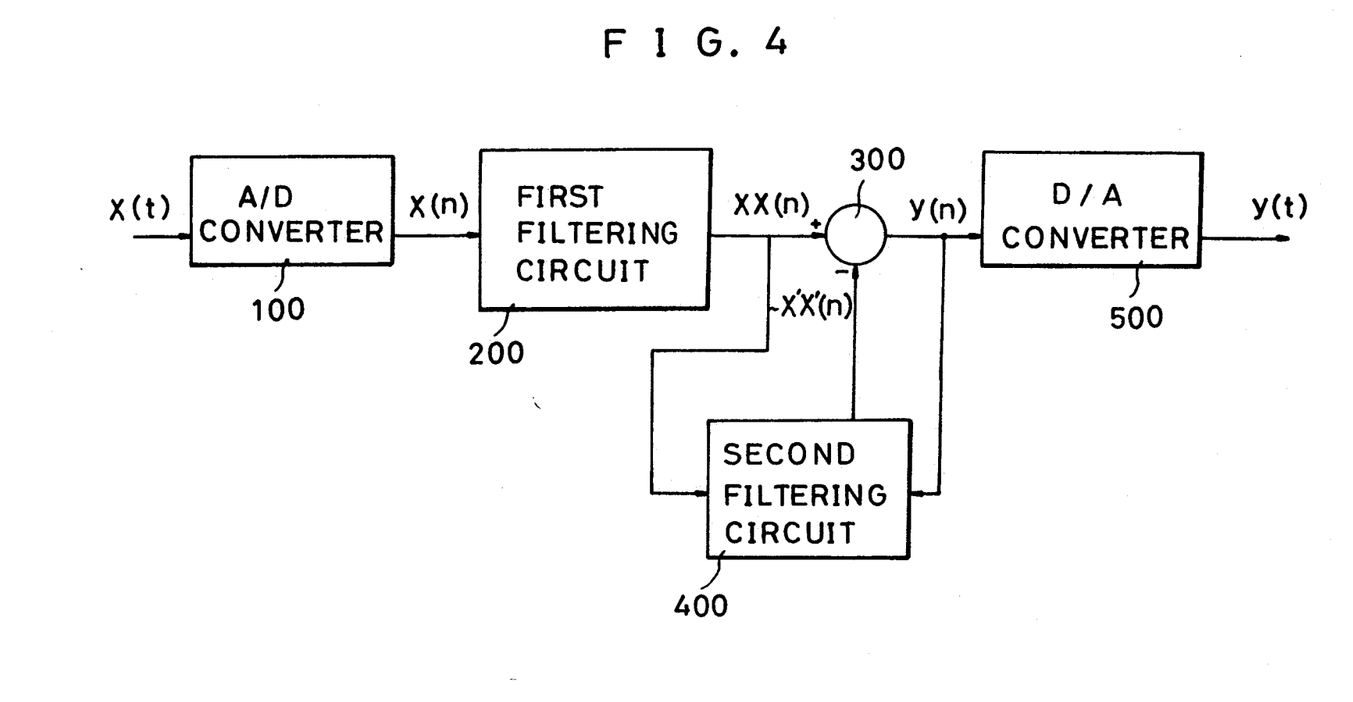
FIG. 4 is a block diagram of a ghost signal removal apparatus for a broadcast reception system in accordance with the present invention.

Referring to FIG. 4, there is shown a block diagram of a ghost signal removal apparatus for a broadcast reception system such as a television receiver of an NTSC system, in accordance with the present invention. As shown in FIG. 4, the ghost signal removal apparatus of the present invention comprises an analog/digital (A/D) converter 100 for converting a video signal $x(t)$ of a received television signal into a digital signal $x(n)$. A first filtering circuit 200, being adaptive to a reference signal $x'(n)$ contained in the digital signal $x(n)$ from the A/D converter 100, removes from the digital signal $x(n)$ a ghost signal component appearing at the front of a main video signal. A second filtering circuit 400, being adaptive to a reference signal $x'x'(n)$ contained in an output signal $xx(n)$ from the first filtering circuit 200, removes from a fed-back final video signal $y(n)$ a ghost signal component appearing at the rear of the main video signal. A first subtracter 300 subtracts an output signal from the second filtering circuit 400 from the output signal $xx(n)$ from the first filtering circuit 200 to obtain the final video signal $y(n)$ in which the ghost signal has been removed. A digital-/analog (D/A) converter 500 converts the output video signal y(n) from the first subtracter 300 into an analog signal y(t).

Figure 5A:
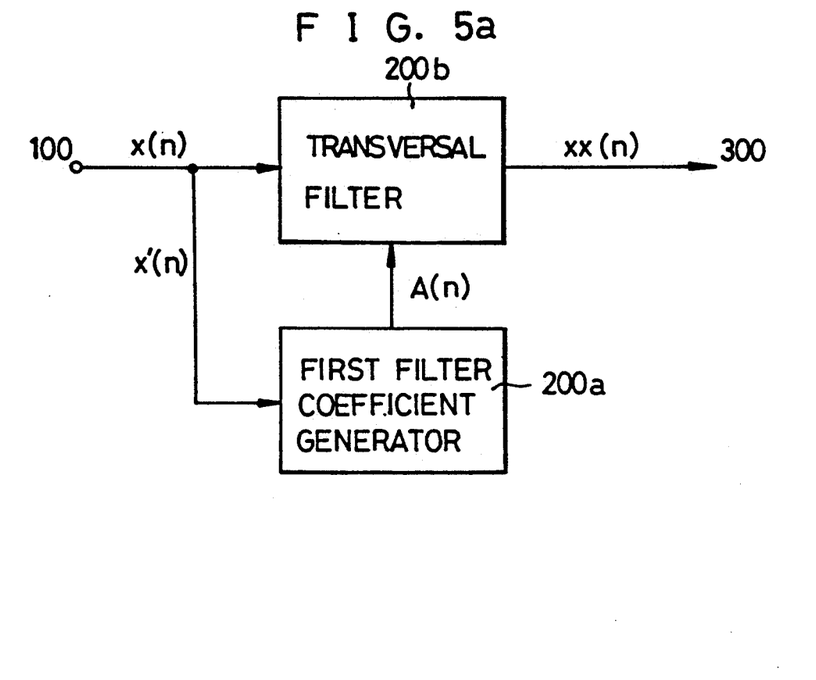
FIG. 5a is a block diagram of a first filtering circuit in the apparatus in FIG. 4.

Referring to FIG. 5a, there is shown a block diagram of the first filtering circuit 200 in the apparatus in FIG. 4. As shown in this drawing, the first filtering circuit 200 includes a first filter coefficient generator 200a for obtaining a first filter coefficient A(n) from the component reference signal x'(n) in digital signal x(n) from the A/D converter 100. A transversal filter 200b operates a first adaptive digital filter for removing from the digital signal x(n) the ghost signal component appearing at the front of the main video signal in accordance with the first filter coefficient A(n) from the first filter coefficient generator 200a.

Figure 5B:
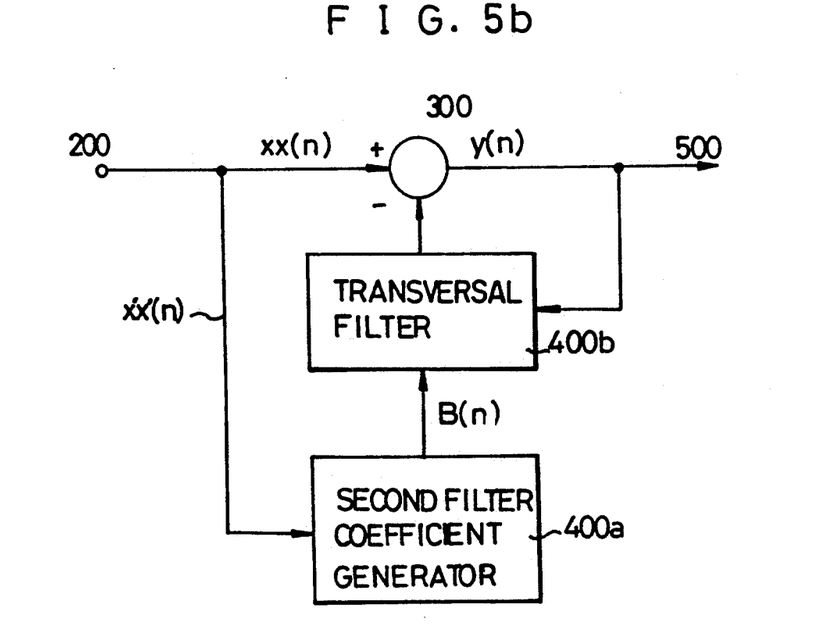
FIG. 5b is a block diagram of a second filtering circuit in the apparatus in FIG. 4.

Referring to FIG. 5b, there is shown a block diagram of the second filtering circuit 400 in the apparatus in FIG. 4. As shown in this drawing, the second filtering circuit 400 includes a second filter coefficient generator 400a for obtaining a second filter coefficient B(n) from the component reference signal x'x'(n) in the output signal xx(n) from the first filtering circuit 200. A transversal filter 400b operates as a second adaptive digital filter for removing from the output signal y(n), from the first subtracter 300, the ghost signal component appearing at the rear of the main video signal in accordance with the second filter coefficient B(n) from the filter coefficient generator 400a.

Figure 6:
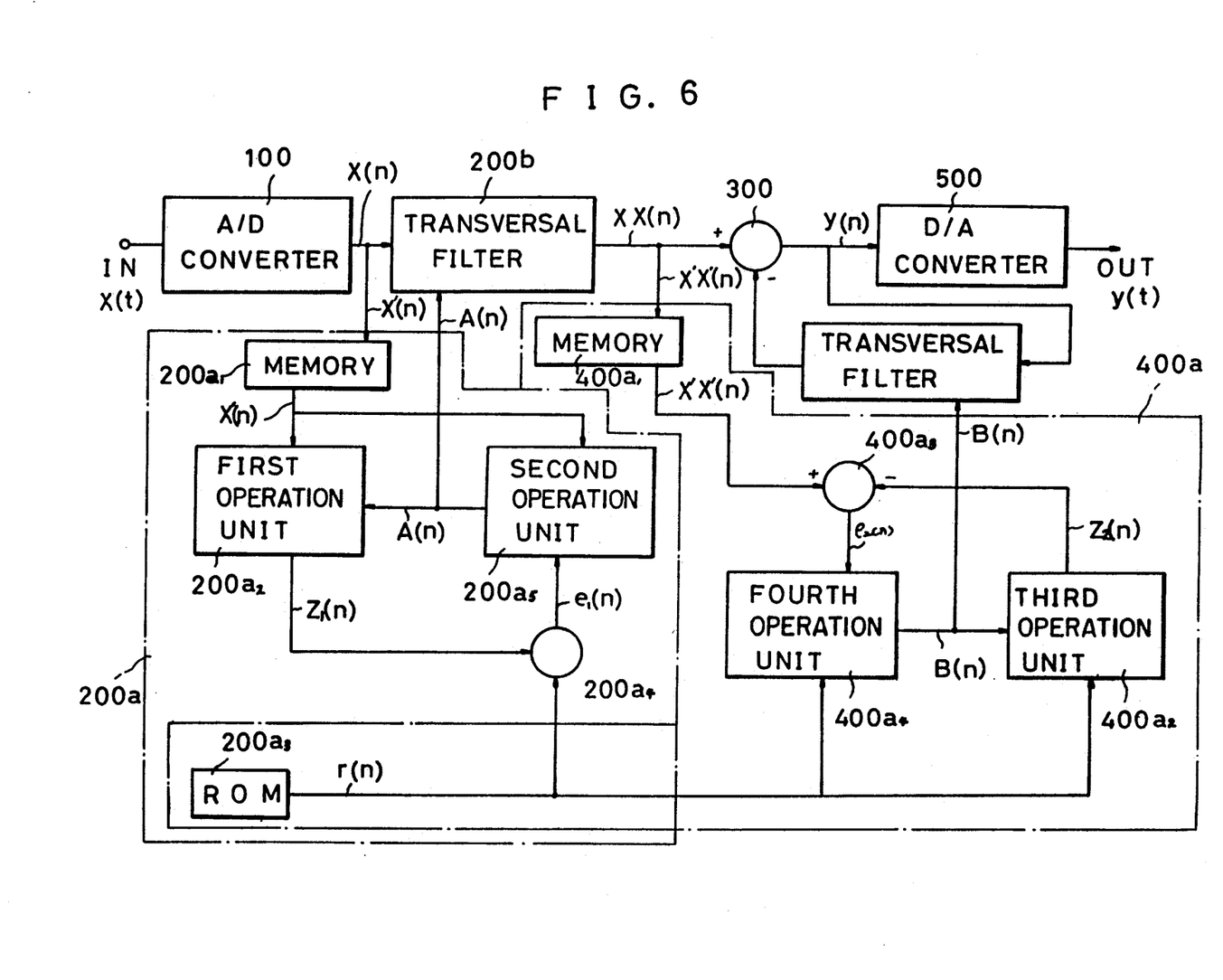
FIG. 6 is a detailed block diagram of the ghost signal apparatus in FIG. 4 in accordance with an embodiment of the present invention.

Referring to FIG. 6, there is shown a detailed block diagram of the ghost signal apparatus in FIG. 4 in accordance with an embodiment of the present invention. As shown in FIG. 6, the first filter coefficient generator 200a in FIG. 5a includes a line memory 200a1 as a first memory for storing the reference signal x'(n) in the output signal x(n) from the A/D converter 100 in the unit of line. A first operation unit 200a2 is provided for convoluting the first filter coefficient A(n) and the reference signal x' (n) stored in the line memory 200a1. A read only memory (ROM) 200a3 operates as a second memory to store a predetermined reference signal r(n) which is the same as a reference signal transmitted from a broadcasting station. A second subtracter 200a4 subtracts an output signal $Z_1(n)$ from the first operation unit 200a2 from the predetermined reference signal r(n) stored in the ROM 200a3 to obtain a first error signal $e_1(n)$. A second operation unit 200a5 executes an LMS algorithm using the reference signal x'(n) stored in the line memory 200a1 and the first error signal $e_1(n)$ from the second subtracter 200a4 to obtain the first filter coefficient A(n).

The second filter coefficient generator 400a also includes the ROM 200a3, which stores the predetermined reference signal r(n) which is the same as the reference signal transmitted from the broadcasting station. Further, the second filter coefficient generator 400a includes a line memory 400a1 as a third memory for storing the reference signal x'x'(n) in the output signal xx(n) from the first filtering circuit 200 in the unit of line.

A third operation unit 400a2 is provided for convoluting the second filter coefficient B(n) and the predetermined reference signal r(n) stored in the ROM 200a3. A third subtracter 400a3 subtracts an output signal $Z_2(n)$ from the third operation unit 400a2 from the reference signal x'x'(n) stored in the line memory 400a1 to obtain a second error signal $e_2(n)$. A fourth operation unit 400a4 executes an LMS algorithm using the predetermined reference signal r(n) stored in the ROM 200a3 and the second error signal $e_2(n)$ from the third subtracter 400a3 to obtain the second filter coefficient B(n).

As indicated above, the first and second filter coefficient generators 200a and 400a have in common the ROM 200a3 as the second memory for storing the predetermined reference signal r(n) which is the same as the reference signal transmitted from the broadcasting station.

In accordance with the circuitry in FIG. 6, the first operation unit 200a2, the second operation unit 200a5 and the second subtracter 200a4 in the first filter coefficient generator 200a cooperate to approximate the ghost signal removal reference signal x'(n) contained in the video signal x(n) of the received broadcasting signal to the predetermined reference signal r(n) stored in the ROM 200a3. Also, the third operation unit 400a2, the fourth operation unit 400a4 and the third subtracter 400a3 in the second filter coefficient generator 400a cooperate to approximate the predetermined reference signal r(n) stored in the ROM 200a3 to the reference signal x'x'(n) contained in the output signal from the first filtering circuit 200.

In this manner, the first and second filter coefficients A(n) and B(n) can be obtained independently by the present invention to provide improvement over the prior art.

The operation of the ghost signal removal apparatus with the above-mentioned construction in accordance with the present invention will hereinafter be described in detail with reference to FIG. 6.

The video signal x(t) of the received broadcasting signal is first received by the A/D converter 100, which converts the received video signal x(t) into the digital signal x(n) (where n is the sample number). The ghost signal removal reference signal $x^1(n)$ contained in the digital video signal x(n) is stored in the line memory 200a1. The transversal filter 200b acts to remove from the digital video signal x(n), from the A/D converter 100, the ghost signal component at the front of the main video signal and to output the resulting video signal xx(n) to the first subtracter 300. At this time, the ghost signal removal reference signal x'x'(n) contained in the video signal xx(n) is stored in the line memory 400a1.

The first subtracter 300 subtracts a video signal, in which the ghost signal component at the rear of the main video signal has been removed, from the output signal xx(n) from the transversal filter 200b, in which the ghost signal component at the front of the main video signal has been removed, thereby to obtain the final video signal y(n).

The final video signal y(n) with the ghost signal removed is converted into an output analog video signal y(t) (which corresponds to the originally broadcast signal) in the D/A converter 500.

Herein, the constructions of the transversal filters 200b and 400b in the first and second filtering circuits 200 and 400 are the same as those in FIG. 3 and a description thereof will thus be omitted. In operation, the transversal filter 200b delays the inputted digital signal x(n) by the plurality of steps and sequentially stores the delayed samples.

The transversal filter 200b then adjusts the gains of the samples in accordance with the elements $a_1$ to $a_{NF}$ of the filter coefficient A(n) from the filter coefficient generator 200a which is obtained as a result of the execution of the LMS algorithm. The adder 2c in the transversal filter 200b adds the gain-adjusted samples and outputs the added signal as the video signal in which the ghost signal component at the front of the main video signal has been removed.

Similarly, the transversal filter 400b delays the inputted digital signal xx(n) by the plurality of steps and sequentially stores the delayed samples. The transversal filter 400b then adjusts the gains of the samples in accordance with the elements $b_1$ to $b_{NB}$ of the filter coefficient B(n) from the filter coefficient generator 400a which is obtained as a result of the execution of the LMS algorithm. The adder 3c in the transversal filter 400b adds the gain-adjusted samples and outputs the added signal as the video signal in which the ghost signal component at the rear of the main video signal has been removed.

The reference signal x'(n) from the line memory 200a1 is applied to the first operation unit 200a2 and to the second operation unit 200a5 which also receives the first error signal e'(n) from the second subtracter 200a4. The second operation unit 200a5 performs the LMS algorithm with respect to the inputted signals $x^1(n)$ and $e_1(n)$ as follows:

$$A(n)=A(n-1)+2K_1e_1(n-1)x'(n-1) \qquad \text{(EQUATION 11)}$$

The first filter coefficient A(n) obtained as a result of the above operation is applied to the transversal filter 200b for adjustment of the filter coefficient of the transversal filter 200b and also to the first operation unit 200a2. The first operation unit 200a2 executes the convolution algorithm with respect to the inputted signals x'(n) and A(n) as follows:

$$z_1(n) = \sum_{i=0}^{N} A_i(n)x'(n-i) = A^T(n)x(n) \qquad \text{(EQUATION 12)}$$

The signal $z_1(n)$ obtained as a result of the above operation is applied to the second subtracter 200a4 which subtracts the signal $z_1(n)$ from the first operation unit 200a2 from the predetermined reference signal r(n) stored in the ROM 200a3. The resulting output is the first error signal $e_1(n)$ which is needed for execution of the LMS algorithm in the second operation unit 200a5.

The ghost signal removal reference signal r(n) which is stored in the ROM 200a3 can be defined by the following equation:

$$r(n)=[r(n)r(n-1)r(n-2)\ldots r(n-NB)] \qquad \text{(EQUATION 13)}$$

The first error signal $e_1(n)$ which is outputted from the second subtractor 200a4 can be defined by the following equation:

$$e_1(n)=r(n)-z_1(n) \qquad \text{(EQUATION 14)}$$

The second operation unit 200a5 obtains the first filter coefficient A(n) for adjustment of the filter coefficient of the transversal filter 200b by executing the LMS algorithm expressed by EQUATION 11. The error between the received reference signal x'(n) and the predetermined reference signal r(n) is minimized and the first filter coefficient A(n) of a new value is obtained on the basis of the minimized error. The signal $z_1(n)$ and first error signal $e_1(n)$ of new values are obtained on the basis of the first filter coefficient A(n) of the new value. The first error signal $e_1(n)$ of the new value is applied to the second operation unit 200a5, which then obtains the first filter coefficient A(n) of a new value on the basis of the newly minimized error.

With a repetition of the above operation, the transversal filter 200b is adaptive to the received reference signal x'(n) to remove the ghost the signal component at the front of the main video signal.

The reference signal x'x'(n) contained in the video signal xx(n) from the transversal filter 200b is stored in the line memory 400a1. The reference signal x'x'(n) from the line memory 400a1 is applied to the third subtracter 400a3 and can be defined by the following equation:

$$x'x'(n)=[x'x'(n)x'x'(n-1)x'x'(n-2)\ldots x'x'(n-NB)] \qquad \text{(EQUATION 15)}$$

The third subtractor 400a3 inputs the reference signal x'x'(n) from the line memory 400a1 and the output signal $Z_2(n)$ from the third operation unit 400a2 and performs an operation with respect to the inputted signals as follows:

$$e_2(n)=x'x'(n)-z_2(n) \qquad \text{(EQUATION 16)}$$

The third subtracter 400a3 obtains the second error signal $e_2(n)$ as a result of the above operation and applies it to the fourth operation unit 400a4 for execution of the LMS algorithm by the fourth operation unit 400a4.

The fourth operation unit 400a4 executes the LMS algorithm with respect to the inputted signals $e_2(n)$ and r(n) in accordance with the following:

$$B(n)=B(n-1)+2K_2e_2(n-1)r(n-1) \qquad \text{(EQUATION 17)}$$

The second filter coefficient B(n) obtained as a result of the above operation corresponds to approximation of the reference signal r(n) to the reference signal x'x'(n) and is used for adjustment of the filter coefficient of the transversal filter 400b.

The second filter coefficient B(n) outputted from the fourth operation unit 400a4 is again applied to the third operation unit 400a2 and can be expressed by the defined equation:

$$B(n)=[b_0(n)b_1(n)b_2(n)b_3(n)\ldots b_{NB}(n)]^T \qquad \text{(EQUATION 18)}$$

where, T represents a matrix transform.

The third operation unit 400a2 performs the convolution algorithm with respect to the inputted signals B(n) and r(n) as follows:

$$z_2(n) = \sum_{j=0}^{N} B_j(n)r(n-j) = [B(n)]^T r(n) \qquad \text{(EQUATION 19)}$$

The signal $Z_2(n)$ obtained as a result of the above operation is applied to the third subtracter 400a3.

The third subtracter 400a3 performs the subtraction operation with respect to the inputed signals x'x'(n) and $Z_2(n)$, thereby to obtain the second error signal $e_2(n)$ which can be defined by the following equation:

$$e_2(n)=r(n)=Z_2(n) \qquad \text{(EQUATION 20)}$$

The second error signal e₂(n) obtained a result of the above operation is applied to the fourth operation unit 400a4 together with the reference signal 4(n) such that the fourth operation unit 400a4 executes the LMS algorithm for minimization of error.

As indicated above, the fourth operation unit 400a4 obtains the second filter coefficient B(n) for adjustment of the filter coefficient of the transversal filter 400b by executing the LMS algorithm.

Then, the error between the reference signal x'x'(n) and the predetermined reference signal r(n) is minimized and the second filter coefficient B(n) of a new value is obtained on the basis of the minimized error. The signal Z₂(n) and second error signal e₂(n) of new values are obtained on the basis of the second filter coefficient B(n) of the new value. The second error signal e₂(n) of the new value is applied to the fourth operation unit 400a4, which then obtains the second filter coefficient B(n) of a new value on the basis of the newly minimized error.

With a repetition of the above operation, the transversal filter 400b is adaptive to the received reference signal x'x'(n) to remove the ghost signal component at the rear of the main video signal.

In this manner, the filter coefficient of the transversal filter 200b is adjusted by the first and second operation units 200a2 and 200a5 and the filter coefficient of the transversal filter 400b is adjusted by the third and fourth operation units 400a2 and 400a4. Therefore, the ghost signal component at the front of the main video signal u(n) which can be defined by EQUATION 22 below and the ghost signal component at the rear of the main video signal u(n) which can be defined by EQUATION 23 below can be removed from the video signal which can be defined by EQUATION 21, respectively, by the first and second filtering circuits 200 and 400.

$$x(n) = \ldots + a_{-2}u(n-2) + a_{-1}u(n-1) + u(n) + a_1u(n+1) + a_2u(n+2) + \ldots \quad \text{(EQUATION 21)}$$

$$\ldots + a_{-2}u(n-2) + a_{-1}u(n-1) \quad \text{(EQUATION 22)}$$

$$a_1u(n+1) + a_2u(n+2) \ldots \quad \text{(EQUATION 23)}$$

Although the preferred embodiment of the present invention have been disclosed with reference to FIG. 6 which illustrates the construction of a television receiver capable of receiving the broadcasting signal of the NTSC system, the present invention is not limited thereto and may be applied to other broadcasting reception systems such as a satellite broadcasting reception system.

As hereinbefore described, the present invention can provide the following advantages:

First, since the LMS algorithms for obtaining the first and second filter coefficients are performed independently, a time-parallel process for removal of the ghost signal components at the front and rear of the main video signal is enabled. The time-parallel process has the effect of shortening the period of time required to remove the ghost signal.

Second, the transversal filter, as disposed for feedback removal of the ghost signal component at the rear of the main video signal, has essentially no effect on the generation of the second filter coefficient, and the stability of the ghost signal removal operation can accordingly be assured.

Although the preferred embodiments of the present invention have been disclosed for illustrative purposes, those skilled in the art will appreciate that various modifications, additions and substitutions are possible, without departing from the scope and spirit of the invention as set forth in the accompanying claims.

What is claimed is:

1. A ghost signal removal apparatus for a broadcasting reception system comprising:
   analog/digital converting means for converting a video signal of a received broadcasting signal into a digital signal;
   first filtering means adaptive to a reference signal contained in the digital signal from said analog/digital converting means, for receiving from the digital signal from said analog/digital converting means a ghost signal component appearing at the front of a main video signal;
   said first filtering means including:
      a first filter coefficient generator for obtaining a first filter coefficient from the digital signal from said analog/digital converting means; and
      a first adaptive digital filter for removing from the digital signal from said analog/digital converting means the ghost signal component appearing at the front of the main video signal in accordance with the first filter coefficient from said first filter coefficient generator;
      a first memory for storing the reference signal contained in the output signal from said analog/digital converting means;
      a first operation unit for convoluting the inputted first filter coefficient and the reference signal stored in said first memory;
      a second memory for storing a predetermined reference signal which is the same as a reference signal transmitted from a broadcasting station;
      a first subtracter for subtracting an output signal from said first operation unit from the predetermined reference signal stored in said second memory to obtain a first error signal; and
      a second operation unit for performing a least mean square algorithm using the reference signal stored in said first memory and the first error signal from said first subtracter to obtain the first filter coefficient;
   second filtering means adaptive to a reference signal contained in an output signal from said first filtering means, for removing from a fed-back final video signal a ghost signal component appearing at the rear of the main video signal;
   subtracting means for subtracting an output signal from said second filtering means from the output signal from said first filtering means to obtain the final video signal in which the ghost signal has been removed; and
   digital/analog converting means for converting an output signal from said subtracting means into an analog signal.

2. A ghost signal removal apparatus for a broadcasting reception system, as set forth in claim 1, wherein said first memory is a line memory.

3. A ghost signal removal apparatus for a broadcasting reception system, as set forth in claim 1, wherein said first operation unit performs the following convolution algorithm:

$$z_1(n) = \sum_{i=0}^{N} Ai(n) - x'(n - i)$$

where, $z_1$ is the output signal from the first operation unit, A is the first filter coefficient, $x'$ is the reference signal stored in the first memory, N is a positive integer and i is the index number.

4. A ghost signal removal apparatus for a broadcasting reception system, as set forth in claim 1, wherein said second memory is a ROM.

5. A ghost signal removal apparatus for a broadcasting reception system, as set forth in claim 1, wherein said second operation unit performs the following least mean square algorithm:

$$A(n)=A(n-1)+2K_1e_1(n-1)x'(n-1)$$

where, A is the first filter coefficient, $K_1$ is a constant, $e_1$ is the first error signal, $x'$ is the reference signal stored in the first memory and $n-1$ is the previous first filter coefficient.

6. A ghost signal removal apparatus for a broadcasting reception system comprising:

analog/digital converting means for converting a video signal of a received broadcasting signal into a digital signal;

first filtering means adaptive to a reference signal contained in the digital signal from said analog/digital converting means, for removing from the digital signal from said analog/digital converting means a ghost signal component appearing at the front of a main video signal;

said second filtering means including:

a second filter coefficient generator for obtaining a second filter coefficient from the output signal from said first filtering means; and a second adaptive digital filter for removing from the output signal from said subtracting means the ghost signal component appearing at the rear of the main video signal in accordance with the second filter coefficient from said second filter coefficient generator; said second filter coefficient generator including:

a second memory for storing a predetermined reference signal which is the same as a reference signal transmitted from a broadcasting station;

a third memory for storing the reference signal contained in the output signal from said first filtering means;

a third operation unit for convoluting the second filter coefficient and the predetermined reference signal stored in said memory;

a second subtracter for subtracting an output signal from said third operation unit from the reference signal stored in said third memory to obtain a second error signal; and a fourth operation unit for performing a least mean square algorithm using the predetermined reference signal stored in said second memory and the second error signal from said second subtracter to obtain the second filter coefficient;

subtracting means for subtracting an output signal from said second filtering means from the output signal from said first filtering means to obtain the final video signal in which the ghost signal has been removed; and digital/analog converting means for converting an output signal from said subtracting means into an analog signal.

7. A ghost signal removal apparatus for a broadcasting reception system, as set forth in claim 6, wherein said third memory is a line memory.

8. A ghost signal removal apparatus for a broadcasting reception system, as set forth in claim 6, wherein said third operation unit performs the following convolution algorithm:

$$z_2(n) = \sum_{j=0}^{N} Bj(n)r(n - j)$$

where, $z_2$ is t signal from the third operation unit, B is the second filter coefficient, r is the reference signal stored in the second memory, N is a positive integer and j is the index number.

9. A ghost signal removal apparatus for a broadcasting reception system, as set forth in claim 6, wherein said fourth operation unit performs the following least mean square algorithm:

$$B(n)=B(n-1)+2K_2e_2(n-1)r(n-)$$

where, B is the second filter coefficient, $K_2$ is a constant, $e_2$ is the second error signal, r is the reference signal stored in the second memory and $n-1$ is the previous second filter coefficient.

* * * * *

UNITED STATES PATENT AND TRADEMARK OFFICE
CERTIFICATE OF CORRECTION

PATENT NO. : 5,299,004
DATED : March 29, 1994
INVENTOR(S) : Kwang Cheol JOO et al.

It is certified that error appears in the above-indentified patent and that said Letters Patent is hereby corrected as shown below:

Claim 1, Column 12, Line 17: "receiving" should read --removing--.

Claim 3, Column 13, Lines 1-4: in the algorithm, close the space between "$\Sigma$" and "A".

Claim 8, Column 14, Lines 31-34: in the algorithm, close the space between "$\Sigma$" and "B".

Claim 8, Column 14, Line 35: "t" should read --the output--.

UNITED STATES PATENT AND TRADEMARK OFFICE
CERTIFICATE OF CORRECTION

PATENT NO. : 5,299,004
DATED : March 29, 1994
INVENTOR(S) : Kwang Cheil Joo, et. al.

It is certified that error appears in the above-indentified patent and that said Letters Patent is hereby corrected as shown below:

Claim 9, Column 14, Line 44: in the algorithm, "(n-)" should read --(n-1)--.

Signed and Sealed this

Twenty-fourth Day of January, 1995

Attest:

BRUCE LEHMAN

Attesting Officer

Commissioner of Patents and Trademarks